Mar. 20, 1923.
E. O. WEEKS.
RADIATOR ATTACHMENT.
FILED NOV. 12, 1920.
1,448,889.
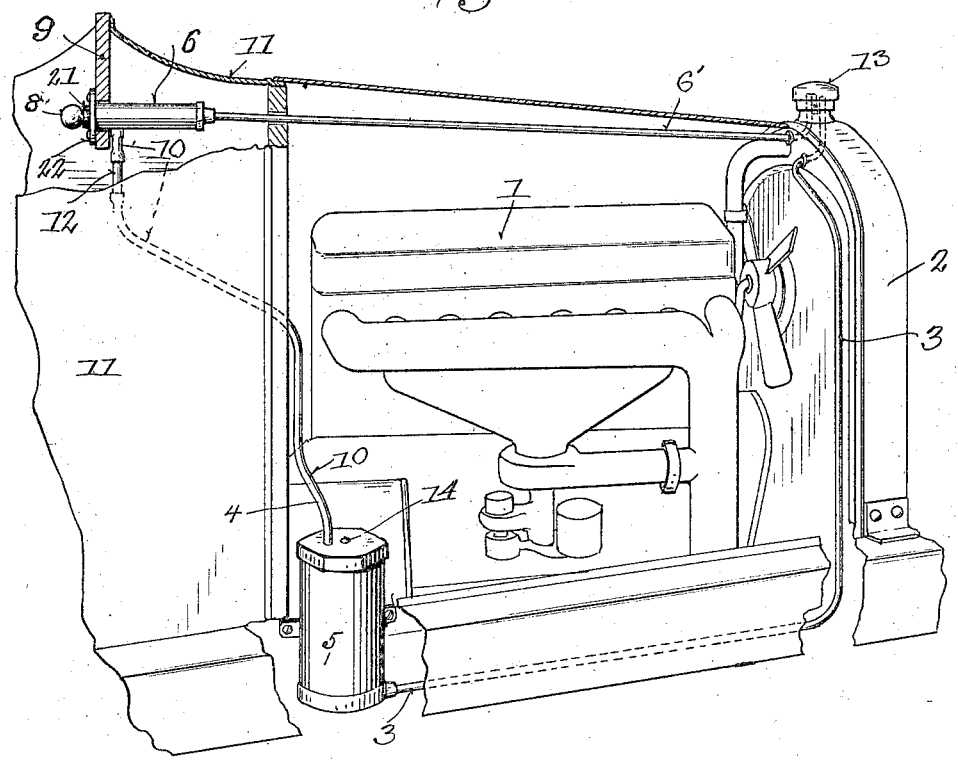
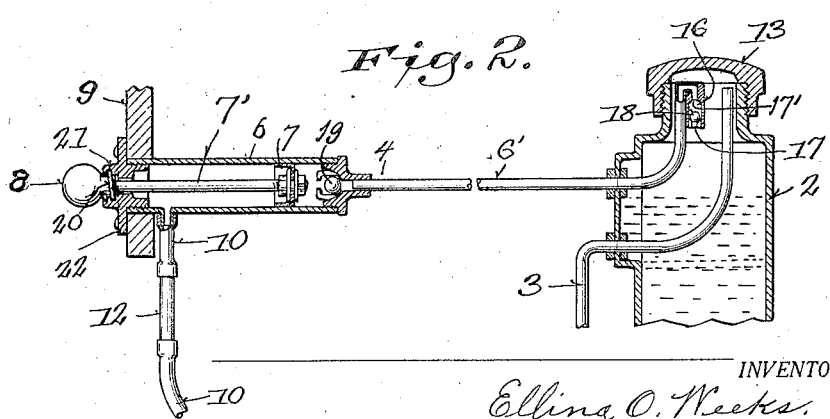
INVENTOR.
Elling O. Weeks.
BY Morsell + Keeney,
ATTORNEYS.

Patented Mar. 20, 1923.

1,448,889

UNITED STATES PATENT OFFICE.

ELLING O. WEEKS, OF MILWAUKEE, WISCONSIN.

RADIATOR ATTACHMENT.

Application filed November 12, 1920. Serial No. 423,713.

*To all whom it may concern:*

Be it known that I, ELLING O. WEEKS, a citizen of the United States, and resident of Milwaukee, in the county of Milwaukee and State of Wisconsin, have invented new and useful Improvements in Radiator Attachments, of which the following is a description, reference being had to the accompanying drawings, which are a part of this specification.

This invention relates to improvement in radiator attachments more particularly adapted for internal combustion engines of motor driven vehicles.

It is desirable to maintain the temperature of the walls of the internal combustion engine at a predetermined degree to operate the engine at the highest point of efficiency. Heretofore this has been very difficult due to a large extent to the difficulty in maintaining a proper amount of cooling medium in the radiator. If too much medium is poured into the radiator it is apt to boil over and discharge through the overflow pipe, when the engine is heated up in running condition, and furthermore there is a constant loss from the overflowing and vaporization of the medium. As it is not always convenient to recharge the radiator when the shortage is discovered the engine is operated for a considerable time without sufficient cooling medium and ofttimes considerable damage is done to the engine from overheating.

It is one of the objects of the present invention to overcome the before mentioned objectionable features and provide a radiator attachment having a supplemental supply of cooling medium from which the radiator may be easily recharged from time to time as desired without the necessity of the operator leaving the seat of the vehicle.

A further object of the invention is to provide a radiator attachment which received the overflow from the radiator and eliminates the loss of the medium.

A further object of the invention is to provide a radiator attachment which may be manually operated from the operator's seat to refill the radiator from the attachment.

A further object of the invention is to provide radiator attachment having a means visible from the operator's seat for indicating when the radiator has been filled with the cooling medium.

A further object of the invention is to provide a radiator attachment which can be easily and inexpensively attached to the radiator of any motor vehicle without impairing its appearance or interfering in any manner with the functions of the mechanism.

With the above and other objects in view the invention consists of the improved radiator attachment and its parts and combinations as set forth in the claims, and all equivalents thereof.

In the accompanying drawing in which the same reference characters indicate the same parts in all of the views:

Fig. 1 is a perspective view, partly in section of the front portion of a motor vehicle showing the improved radiator attachment connected thereto; and Fig. 2 is an enlarged vertical sectional view of the attachment shown connected to the radiator and to the instrument board of the vehicle.

Referring to the drawing which shows the front portion of a motor vehicle the numeral 1 indicates the engine, 2 the radiator, 3 the overflow pipe or duct and 4 the improved radiator attachment. Said attachment comprises a supplemental reservoir or tank 5 and a controlling member 6 in the form of a pump having a yielding flanged piston 7 provided with a stem 7' which extends through the outer end of the pump and has a handle formed on its outer end for convenience of manual operation. The pump extends through and is fastened to the instrument board 9 of the vehicle.

A vacuum pipe 6' connects the inner end of the pump 6 to the upper portion of the radiator and a pipe 10 connects the outer end portion of the pump to the upper portion of the supplemental reservoir 5.

The pipes just mentioned and the controlling member or pump are all positioned beneath the cowl 11, and the reservoir 5 is mounted in any convenient position beneath the hood or cowl.

The overflow pipe 3 is extended and connected to the lower portion of the supplemental reservoir 5, and a portion 12 of the pipe 10 is formed of transparent tubing or glass so that the flow of the cooling medium therethrough is easily visible to the operator.

The ordinary radiator cap 13 seals the radiator to permit the formation of a partial vacuum therein or if not sealed, an ordinary gasket (not shown) may be used between the cap and the radiator. The supplemental tank 5 is provided with an air outlet opening 14 to permit the escape of air therefrom.

To prevent the cooling medium from overflowing into the vacuum pipe 6' the inlet portion of said pipe within the upper part of the radiator is provided with a down turned member 16 having an opening 17 at its lower end in which a ball valve 18 is positioned. Said valve 18 is moved upwardly to close its seat 17' by the cooling medium within the radiator, and the suction of the pump.

The pump 6 is also provided with a ball valve 19 to prevent outward movement of air therefrom, the piston 7 also serving as the other valve for said pump as the forward movement of the piston permits the passage of air between the piston flange and the cylinder of the pump.

The piston stem handle 8 may, if desired, be provided with a threaded portion 20 which turns into a threaded socket part 21 in the plate 22 forming the outer end portion of the pump cylinder, to removably hold the piston in its innermost position.

In operation the radiator is filled and the supplemental reservoir partly filled with a liquid cooling medium and the engine is started in the ordinary manner. As the engine heats up in running, the cooling medium will warm up and any portion which overflows into the pipe 3 will be directed into the supplemental reservoir for subsequent use and is therefore not wasted as under ordinary constructions. As some of the medium within the radiator is eventually lost through evaporation or leakage of cooling system, the radiator is easily refilled by simply reciprocating the valve to exhaust the air from the radiator above the medium and the atmospheric pressure will force the medium from the supplemental reservoir through the pipe 3 into the radiator.

If the pumping is continued after the radiator is filled, some of the cooling medium will pass the valve 18 and enter the pump and the operator will be immediately aware of it due to the greater resistance in pumping the more solid fluid and said fluid will flow out of the pump and back to the reservoir through the transparent portion of the pipe 10 in full view of the operator.

It is also to be noted that each time the engine stops, the medium will cool and produce a partial vacuum in the radiator and automatically cause some of the medium to be returned from the reservoir to the radiator.

Attention is also directed to the fact that in winter driving, a large amount of alcohol is used in the cooling medium and that the attachment prevents the loss of the alcohol caused by overflow and evaporation, as in the latter case the vapor in passing through the overflow pipe enters into the bottom portion of the reservoir and is condensed in passing upwardly through the cooling medium within the reservoir.

From the foregoing description it will be seen that the reservoir acts as an expansion tank to receive the overflow and vapor from the radiator, and also acts as a condensing means for the vapor and a supply reservoir under the direct manual control of the operator so that the radiator may be refilled from time to time within the limits of the reservoir capacity.

What I claim as my invention is:

1. The combination within the cooling system of an internal combustion engine, of a reservoir in communication therewith, and manually actuated means for creating a partial vacuum in the cooling system to cause a cooling medium within the reservoir to flow into the cooling system.

2. The combination with the radiator of an internal combustion engine, of a reservoir in communication therewith, visible means for indicating an overcharge of cooling medium to the radiator, and manually actuated means for creating a partial vacuum within the radiator to cause a cooling medium within the reservoir to flow into the radiator.

3. The combination with the radiator of an internal combustion engine, of a reservoir in communication therewith and receiving the overflow cooling medium therefrom; visible means for indicating an overcharge of the cooling medium to the radiator, and manually actuated means for creating a partial vacuum within the radiator to cause the cooling medium within the reservoir to return to the radiator.

4. The combination with the radiator of an internal combustion engine, of a reservoir having plural means in communication with the radiator, and a pump included in one of the means in communication with the reservoir for creating a partial vacuum in the radiator to withdraw a cooling medium from the reservoir to the radiator.

5. The combination with the radiator of an internal combustion engine, of a reservoir having tubes in communication with the radiator, and a pump connected to one of the tubes for creating a partial vacuum in the radiator to withdraw a cooling medium from the reservoir to the radiator, said pump being manually operable within the vehicle.

6. The combination with the cooling system of an internal combustion engine subject to depletion, of a source of repletion, and manually operable means for effecting repletion, said means creating a partial vacuum in the system to permit atmospheric pressure to effect the repletion.

7. The combination with the radiator of an internal combustion engine, of a reservoir, an overflow tube connecting the upper portion of the radiator with the lower portion of the reservoir, a vacuum tube connecting the upper portion of the radiator to the reservoir, and a manually operable pump connected to the vacuum tube for exhausting air from the radiator to cause atmospheric pressure to force a cooling medium from the reservoir through the overflow pipe and into the radiator.

8. The combination with the radiator of an internal combustion engine, of a reservoir, an overflow tube connecting the upper portion of the radiator with the lower portion of the reservoir, a manually operable pump having a check valve, a tube connecting the valved portion of the pump with the upper portion of the radiator and having a check valve in its end portion within the radiator, and a tube connecting another portion of the pump with the reservoir.

9. The combination with the radiator of an internal combustion engine, of a reservoir, an overflow tube connecting the upper portion of the radiator with the lower portion of the reservoir, a manually operable pump having a check valve, a tube connecting the valved portion of the pump with the upper portion of the radiator and having a check valve in its end portion within the radiator, and a tube connecting another portion of the pump with the reservoir and having transparent portion to permit view of the flow of the cooling medium therethrough.

10. The combination with a motor vehicle having a radiator and an instrument board, of a reservoir having an upper air opening an overflow tube connecting the upper portion of the radiator with the lower portion of the reservoir, a pump connected to the instrument board and having a check valve in its inner end and a manually operable piston stem extending through its outer end, a tube connected to the inner end of the pump and extending into the upper end portion of the radiator and having a down turned end portion provided with a check valve closing upwardly, and a tube connecting another portion of the pump to the reservoir.

11. The combination with a motor vehicle having a radiator and an instrument board, of a reservoir, having an upper air opening, an overflow tube connecting the upper portion of the radiator with the lower portion of the reservoir, a pump connected to the instrument board and having a check valve in its inner end of the pump and extending into the upper end portion of the radiator and having a down turned end portion provided with a check valve closing upwardly and a tube connecting another portion of the pump to the reservoir and having a transparent portion to permit view of the flow of the cooling medium therethrough.

In testimony whereof, I affix my signature.

ELLING O. WEEKS.